(12) United States Patent
Hunt

(10) Patent No.: US 7,557,738 B2
(45) Date of Patent: Jul. 7, 2009

(54) TEXT ENCODING SYSTEM AND METHOD

(75) Inventor: Stephen Gregory Hunt, Darfield (NZ)

(73) Assignee: ARC Innovations Limited, Wellington (NZ)

( * ) Notice: Subject to any disclaimer, the term of this patent is extended or adjusted under 35 U.S.C. 154(b) by 0 days.

(21) Appl. No.: 12/096,014

(22) PCT Filed: Jul. 16, 2007

(86) PCT No.: PCT/NZ2007/000184

§ 371 (c)(1),
(2), (4) Date: Jul. 18, 2008

(87) PCT Pub. No.: WO2008/007984

PCT Pub. Date: Jan. 17, 2008

(65) Prior Publication Data

US 2008/0298496 A1 Dec. 4, 2008

(30) Foreign Application Priority Data

Jul. 14, 2006 (NZ) ..................... 548528

(51) Int. Cl.
*H03M 5/00* (2006.01)
(52) U.S. Cl. .................. 341/55; 341/50; 341/51; 341/95
(58) Field of Classification Search ............... 341/50, 341/55, 95
See application file for complete search history.

(56) References Cited

U.S. PATENT DOCUMENTS

| | | | |
|---|---|---|---|
| 5,257,220 A | 10/1993 | Shin et al. | |
| 5,625,584 A | 4/1997 | Uchino et al. | |
| 5,663,904 A | 9/1997 | Arase | |
| 5,777,923 A | 7/1998 | Lee et al. | |
| 5,787,484 A | 7/1998 | Norman | |
| 6,100,824 A * | 8/2000 | MacLeod et al. | .............. 341/51 |
| 6,157,570 A | 12/2000 | Nachumovsky | |
| 6,256,232 B1 | 7/2001 | Chang et al. | |
| 6,282,129 B1 | 8/2001 | Khoury et al. | |
| 6,794,997 B2 | 9/2004 | Sprouse | |
| 6,798,353 B2 | 9/2004 | Seal et al. | |

(Continued)

FOREIGN PATENT DOCUMENTS

EP 1322126 A1 6/2003

(Continued)

*Primary Examiner*—Khai M Nguyen
(74) *Attorney, Agent, or Firm*—Townsend and Townsend and Crew LLP

(57) ABSTRACT

The invention provides a method of encoding a binary data message for transmission over a data network. The method comprises allocating consecutive six bit sequences from the binary data message to consecutive respective bytes of an encoded data message; adding a predetermined bias value to some or all of the byte values of the encoded data message; and replacing respective selected data byte values in the encoded data message with one or more corresponding replacement data byte values. The invention further provides a method that comprises forming two or more message fragments from the binary message, each message fragment comprising respective bit sequences of the binary message; encoding each message fragment by the method outlined above to form two or more encoded message fragments; and adding a header to each encoded message fragment. The invention further provides an encoding engine for encoding a binary data message for transmission over a data network.

16 Claims, 3 Drawing Sheets

U.S. PATENT DOCUMENTS

| | | |
|---|---|---|
| 6,922,362 B2 | 7/2005 | La Malfa et al. |
| 7,064,688 B2 * | 6/2006 | Collins et al. ................. 341/87 |
| 7,114,044 B2 | 9/2006 | Takahashi et al. |
| 7,152,147 B2 | 12/2006 | Suzuki |
| 7,158,417 B2 | 1/2007 | Yamada |
| 7,185,152 B2 | 2/2007 | Takahashi et al. |
| 7,287,132 B2 | 10/2007 | Takahashi et al. |
| 7,313,030 B2 | 12/2007 | Lohse et al. |
| 2006/0025119 A1 | 2/2006 | Guida et al. |
| 2007/0061504 A1 | 3/2007 | Lee |

FOREIGN PATENT DOCUMENTS

| | | |
|---|---|---|
| WO | WO02/085046 A1 | 10/2002 |
| WO | WO03/019884 A1 | 3/2003 |

* cited by examiner

TEXT ENCODING SYSTEM AND METHOD

FIELD OF THE INVENTION

The invention relates to a text encoding system and method. More specifically the invention provides a method and system for encoding a binary data message for transmission over a data network.

BACKGROUND TO THE INVENTION

The GSM short message service (SMS) provides a facility for sending messages from an originating device to a terminating device. Both the originating device and the terminating device are connected to the same GSM network via one or more GSM networks.

Messages conforming to the SMS format typically contain only alpha numeric characters. As a consequence of this format restriction there are limits to the extent to which SMS text messages can be used to transmit data.

It is an object of the invention to provide a method and system for encoding a binary data message for transmission over a data network that goes some way to overcoming the abovementioned disadvantages or at least provides industry or the public with a useful choice.

SUMMARY OF THE INVENTION

In broad terms in one form the invention provides a method of encoding a binary data message for transmission over a data network. The method comprises allocating consecutive six bit sequences from the binary data message to consecutive respective bytes of an encoded data message; adding a predetermined bias value to some or all of the byte values of the encoded data message; and replacing respective selected data byte values in the encoded data message with one or more corresponding replacement data byte values.

In broad terms in another form the invention provides a method of encoding a binary data message for transmission over a data network. The method comprises forming two or more message fragments from the binary message, each message fragment comprising respective bit sequences of the binary message; encoding each message fragment by the method outlined in the preceding paragraph to form two or more encoded message fragments; and adding a header to each encoded message fragment.

In broad terms in another form the invention provides a message encoding engine for encoding a binary data message for transmission over a data network. The encoding engine is configured to allocate consecutive six bit sequences from the binary data message to consecutive respective bytes of an encoded data message; add a predetermined bias value to some or all of the byte values of the encoded data message; and replace respective selected data byte values in the encoded data message with one or more corresponding replacement data byte values.

In broad terms in another form the invention provides a message encoding engine that is further configured to form two or more message fragments from the binary message, each message fragment comprising respective bit sequences of the binary message; encode each message fragment to form two or more encoded message fragments; and add a header to each encoded message fragment.

BRIEF DESCRIPTION OF THE FIGURES

Preferred forms of the text encoding system and method will now be described with reference to the accompanying figures in which.

DETAILED DESCRIPTION OF PREFERRED FORMS

Figure 1:
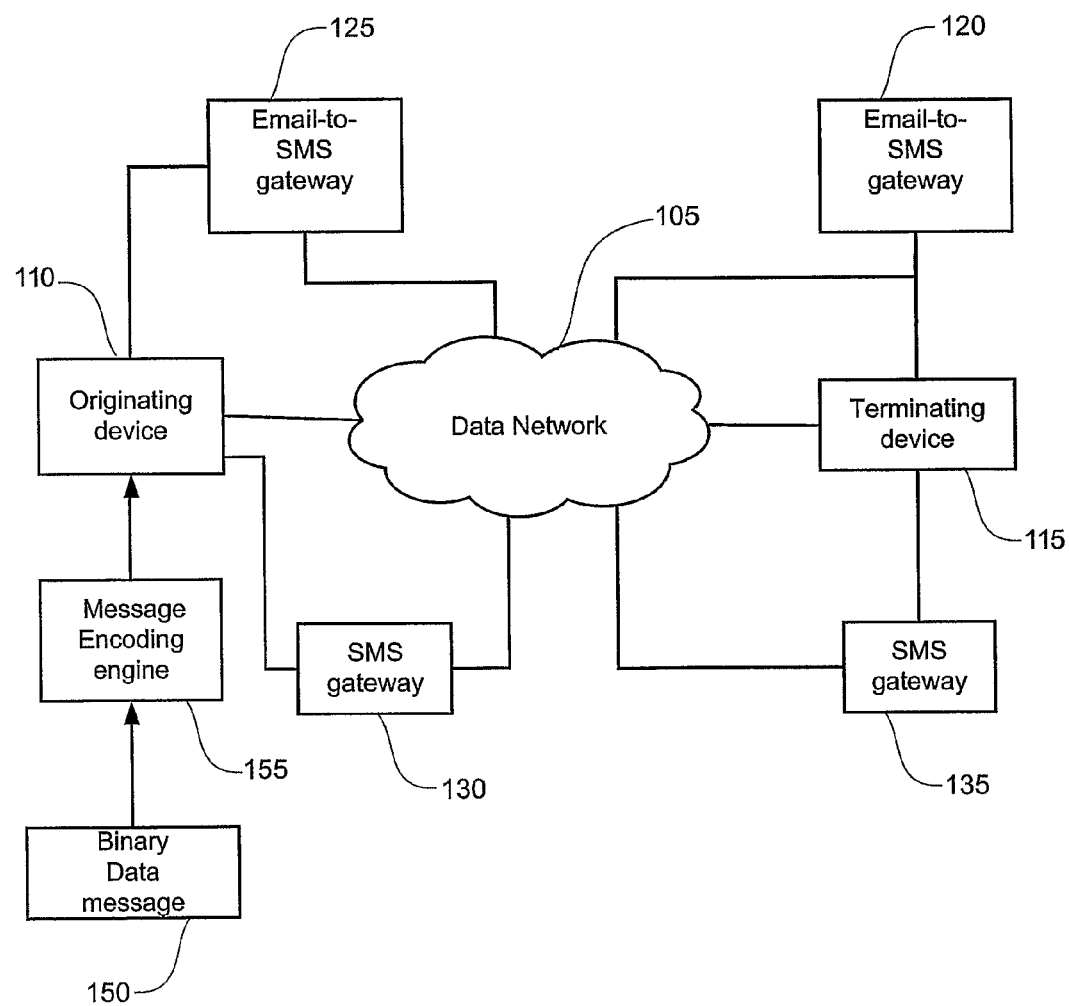
FIG. 1 shows a block diagram of a system in which one form of the invention may be implemented.

FIG. 1 illustrates a block diagram of the preferred system 100 in which one form of the present invention may be implemented. The system includes one or more data networks 105. The data networks 105 include any type of network that facilitates the transmission of data from an originating device 110 to a terminating device 115. Data networks 105 could include a GSM short message service (SMS) network and/or may include further networks that support paging, email and/or internet traffic.

In one embodiment the originating device 110 transmits data messages as email messages over the data network 105. An email-to-SMS gateway 120 receives email messages over the data network 105 and converts the messages to SMS messages ready to deliver to the terminating device 115.

In another embodiment the originating device 110 delivers email messages to an email-to-SMS gateway 125. The gateway then transmits SMS messages over the data network 105 to be received by the terminating device 115 as SMS text messages.

In a further embodiment the originating device 110 is associated with an SMS gateway 130. The originating device delivers SMS messages to the gateway. The gateway then delivers SMS messages over data network 105 to the terminating device 115. It is anticipated that the terminating device 115 has associated with it also an SMS gateway 135.

In a fourth embodiment the originating device 110 is directly interfaced to a GSM transmitting device such as a cell phone or equivalent. Messages are transmitted directly from the GSM device over the data network 105 to be received by for example the SMS gateway 135 associated with the terminating device 115.

It is anticipated that in each of the above embodiments there is a need to convert a binary data message 150 into a form that is compatible with a GSM text message network. The conversion is effected by a message encoding engine 155 or equivalent. This engine 155 is a software implemented encoding engine that functions in the manner set out below.

Figure 2:
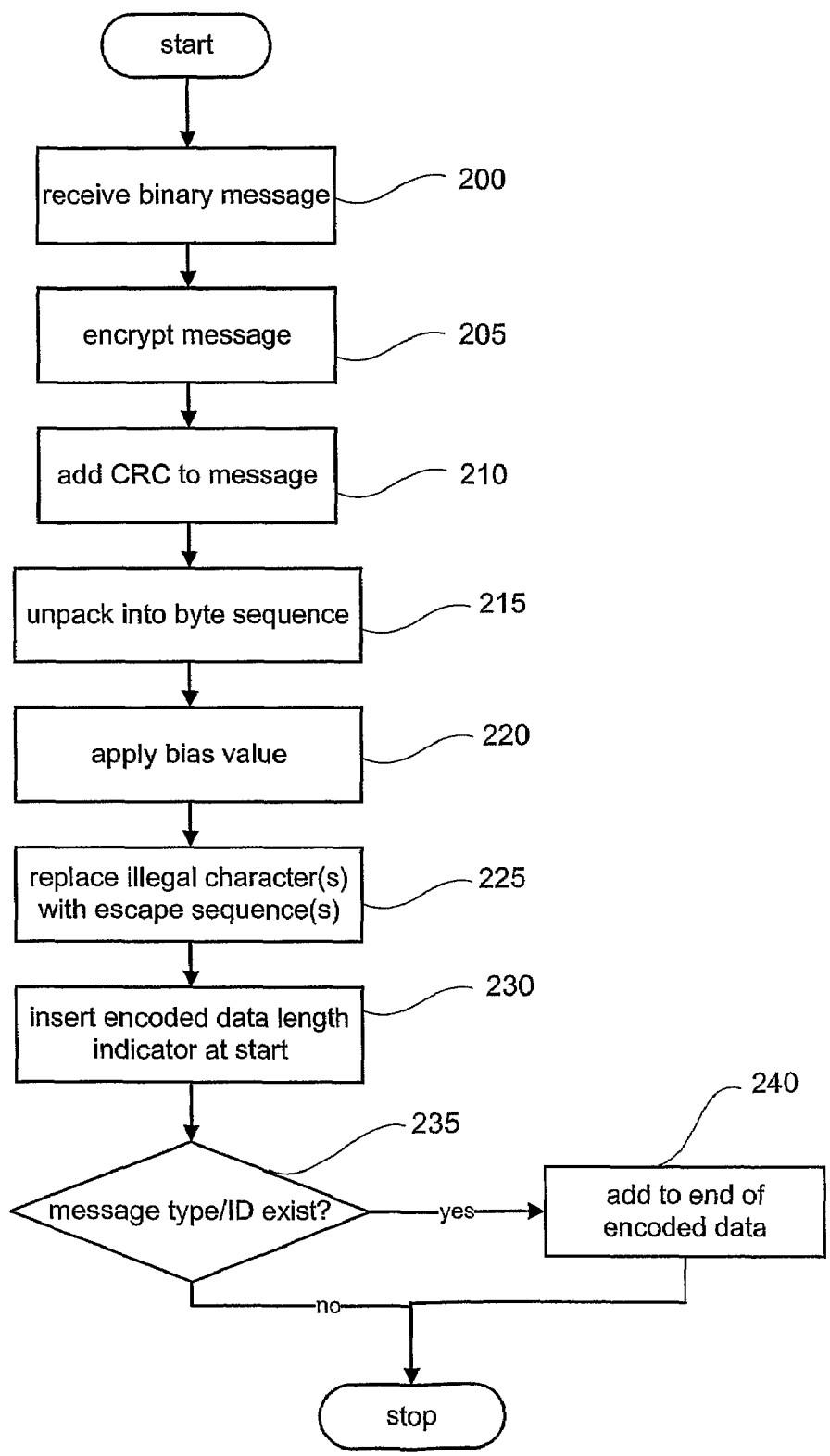
FIG. 2 shows a flow chart of a preferred form method of the invention.

FIG. 2 illustrates in more detail one preferred form function of the message encoding engine 155 of FIG. 1. As shown at step 200 the binary message 150 of FIG. 1 is received 200 by the encoding engine.

In one application of the system, the binary data message has a fixed length of 95 bytes. The typical message contains message data of 69 bytes in length within the fixed length of 95 bytes. The binary data message is encrypted 205 using a suitable encryption algorithm and encryption seed.

A message check sum CRC that is of 2 bytes in length is then added 210. It is expected that the message data will be an 8 bit data type as will the CRC.

The encryption is usually carried out before addition of the CRC but it could be carried out after.

A message type of 8 bytes and a message identifier of 16 bytes is optionally included in the message following the CRC value. It is assumed that both the message type and the message identifier contain data representing characters that are included in the SMS default character set. The SMS default character network is also known as the default GSM alphabet. The GSM alphabet has a similar coding to ASCII characters ranging from Hex 00 to Hex 7F. The range Hex 00 to Hex 1F and the value Hex 7F are non-printable control codes.

One typical message format is set out below in the following table.

| Field Type | Field Length | Data Type | Description |
|---|---|---|---|
| Message Data | 69 | 8 bit | Fixed length card image |
| Message Data CRC | 2 | 8 bit | CRC calculated over the entire card image field using the 16 bit CCITT CRC algorithm. CRC is assumed to be stored in big endian format. |
| Message Type | 8 | 7 bit ASCII | Contains a short text description of the message type. Eg "Init", "PC $50", "Config" etc. Entire field must contain printable characters. |
| Message Identifier | 16 | 7 bit ASCII | Contains a short text description of the message identifer. Eg $1^{st}$ 16 characters of a customers address. Entire field must contain printable characters. |

The next step is to "unpack" 215 the first 71 bytes of the binary message. In this unpacking process the encoding engine expands the series of bytes that contain 8 bits of information into an equivalent longer series of bytes that each contain 6 bits of information.

The 8 bit data in the first 71 bytes of the binary message is unpacked into an array of bytes containing 6 bit data.

The typical 8 bit binary message is represented as a sequence of at least 71 bytes. Each byte contains 8 bit values numbered from 7 to 0. It is assumed that the message data is stored in big endian format although other data formats are also possible. A typical 8 bit binary message is set out below.

| | 8 Bit Data |
|---|---|
| Byte 1 | $B1_7 b1_6 b1_5 b1_4 b1_3 b1_2 b1_1 b1_0$ |
| Byte 2 | $B2_7 b2_6 b2_5 b2_4 b2_3 b2_2 b2_1 b2_0$ |
| Byte 3 | $B3_7 b3_6 b3_5 b3_4 b3_3 b3_2 b3_1 b3_0$ |
| Byte 4 | $B4_7 b4_6 b4_5 b4_4 b4_3 b4_2 b4_1 b4_0$ |
| . | . |
| . | . |
| . | . |
| Byte 71 | $B71_7 b71_6 b71_5 b71_4 b71_3 b71_2 b71_1 b71_0$ |

Following the unpacking process the encoded data message on creation is set out below.

| | 6 Bit Data |
|---|---|
| Byte 1 | $0\ 0\ b1_7 b1_6 b1_5 b1_4 b1_3 b1_2$ |
| Byte 2 | $0\ 0\ b1_1 b1_0 b2_7 b2_6 b2_5 b2_4$ |
| Byte 3 | $0\ 0\ b2_3 b2_2 b2_1 b2_0 b3_7 b3_6$ |
| Byte 4 | $0\ 0\ b3_5 b3_4 b3_3 b3_2 b3_1 b3_0$ |
| Byte 5 | $0\ 0\ b4_7 b4_6 b4_5 b4_4 b4_3 b4_2$ |
| . | . |
| . | . |
| . | . |
| Byte 94 | $0\ 0\ b70_1 b70_0 b71_7 b71_6 b71_5 b71_4$ |
| Byte 95 | $0\ 0\ b71_3 b71_2 b71_1 b71_0\ 0\ 0$ |

An encoded data message is effectively created from the binary data message by allocating consecutive 6 bit sequences from the binary data message to consecutive respective bytes of the encoded data message.

In the above example byte 1 of the binary message has 8 bits. In the initially created and encoded data message bits 7 to 2 $b1_{7\ldots2}$ included in byte 1 of the encoded message as well as two initial null values. The remaining bits of byte 1, bits $b1_1$ and $b1_0$ are stored in byte 2 following two initial null bit values. The next 6 bits of the binary message that make up byte 2 are then sequentially assigned to byte 2 and byte 3.

Some of the data values in the encoded data message will not be compatible with the data network. The method includes the step of applying 220 a bias or offset value to alter the range of the data values to a range that is compatible with the SMS network.

The bias value has a preferred value of 32 in decimal or Hex 20. This value of 32 is added to each byte value of the encoded data message. This transformation forces each byte value of the encoded data to have the value of at least 32. The data value 32 in decimal corresponds to the "space" character in the GSM alphabet. The space character is one that is able to be represented as a character within the SMS network. The value 32 as a bias value is one possible transformation. Other transformations are possible.

The next step following the application of a bias value is typically to replace 225 illegal characters with a suitable escape sequence. The following table shows examples of illegal characters that are not compatible with the SMS network as well as other characters for which it is desirable to remove from the encoded data message. Typical data values that are incompatible with the GSM SMS network include those corresponding to one or more of the characters '[', '\', ']', '^' and '_'. These values in decimal are 91, 92, 93, 94 and 95 respectively. In Hex they are 5B, 5C, 5D, 5E and 5F.

Further characters that are compatible with the SMS network but for which it is desirable to replace with an escape sequence include one or more of '$', '@', and the space character shown as ' '. These values in decimal are 36, 64 and 32 respectively. In Hex they are 24, 40 and 20.

| Character | Escape Sequence |
|---|---|
| '$' (0x24) | ' ', '0' (0x20, 0x31) |
| '@' (0x40) | ' ', '1' (0x20, 0x32) |
| '[' (0x5B) | ' ', '2' (0x20, 0x33) |
| '\' (0x5C) | ' ', '3' (0x20, 0x34) |
| ']' (0x5D) | ' ', '4' (0x20, 0x35) |
| '^' (0x5E) | ' ', '5' (0x20, 0x36) |
| '_' (0x5F) | ' ', '6' (0x20, 0x30) |
| ' ' (0x20) | ' ', '7' (0x20, 0x37) |

Each byte in the encoded message that represents an illegal character is replaced with one of the predetermined 2 byte data values shown above in the escape sequence listing.

The new 8 bit length of the encoded data message is then calculated. This length value is converted to a 2 byte sequence and added 230 to the encoded message, preferably at the beginning of the message. This length value is referred to as an encoded data length indicator.

The typical byte sequence is set out below.

| 8 bit Length | Byte Sequence |
|---|---|
| $b_7 b_6 b_5 b_4 b_3 b_2 b_1 b_0$ | 0 0 1 1 $b_7 b_6 b_5 b_4$ <br> 0 0 1 1 $b_3 b_2 b_1 b_0$ |

If 235 the message type and message identifier fields were included in the original binary message, this message type and message identifier are then added 240 to the encoded message. The message type and message identifier are preferably added to the end of the message.

The encoded message will typically have the following data format.

| Field Type | Field Length | Description |
|---|---|---|
| Encoded Message Length Indicator | 2 | Specifies the 8 bit length of the message data. The lower 4 bits of the 1$^{st}$ byte represent the upper nibble of the length and the lower 4 bits of the 2$^{nd}$ byte represent the lower nibble of the length. |
| Encoded Message Data | Variable | Contains the encoded message data and CRC data. |
| Message Type | 8 | Not changed during the encoding process |
| Message Identifier | 16 | Not changed during the encoding process |

In some data transmission protocols there is a maximum message length. For example with the GSM SMS network there is currently a maximum message length of 160 characters.

Depending on the content of the binary data message, there is a possibility that the length of an encoded message will exceed the SMS message limit of 160 characters.

If this occurs, the message identifier and/or message type can be truncated if they were included in the original binary message.

If the message is still too long following truncation, or if truncation would not bring the message length below the upper limit, the encoded message can then be decoded and the binary message re-encrypted using a different seed value. Alternatively, the original binary data message could be retrieved from computer memory and encrypted with a different seed value. Tests have shown that for a particular data set, the selection of the encryption seed alone can cause the length of the encoded message to vary between 98 and 139 characters.

The length of the encoded message will typically depend on the number of escape characters that need to be inserted into the encoded data message. The insertion of an escape character results in the replacement of one byte of data with two bytes of data.

The best case scenario will require no escape sequences. Assuming a message data length of 69 bytes and CRC length of 2 bytes, the encoded message length will therefore be:

$$l_{best} = EncodedMessageLengthIndicatorLength+$$
$$\frac{\left(\begin{array}{c}MessageDataLength+\\crcLength\end{array}\right)\times 8}{6} + 24$$
$$= 2 + \frac{(69+2)\times 8}{6} + 24$$
$$\cong 121$$

The worst case scenario will require an escape sequence to be inserted for every encoded message byte. This worst case scenario is:

$$l_{worst} = EncodedMessageLengthIndicatorLength+$$
$$\frac{2\times\left(\begin{array}{c}MessageDataLength+\\crcLength\end{array}\right)\times 8}{6} + 24$$
$$= 2 + \frac{2\times(69+2)\times 8}{6} + 24$$
$$\cong 215$$

The worst case scenario exceeds the SMS message limit above of 160 characters. However by choosing an encryption seed to minimise the encoded message length typically less than 10 escape sequences are required. Therefore the typical encoded message length is:

$$l_{typical} = EncodedMessageLengthIndicatorLength+$$
$$\frac{\left(\begin{array}{c}messageDataLength+\\crcLength\end{array}\right)\times 8}{6} + 10 + 24$$
$$= 2 + \frac{(69+2)\times 8}{6} + 10 + 24$$
$$\cong 131$$

Figure 3:
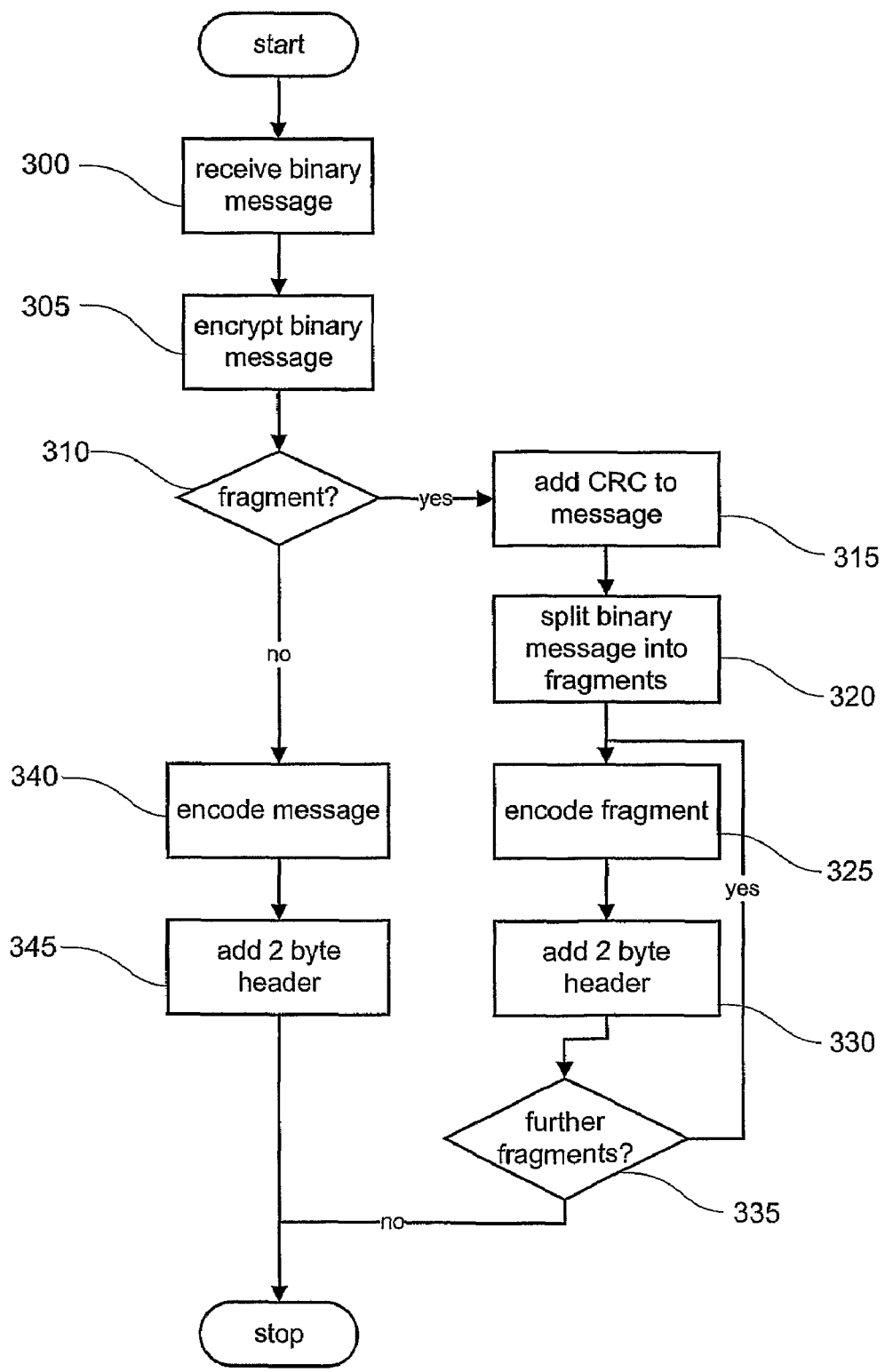
FIG. 3 shows a flow chart of another preferred form method that supports fragmentation.

If truncation and/or re-encryption are not sufficient to bring the encoded message within the 160 character limit, in one embodiment the encoding scheme supports fragmentation. FIG. 3 illustrates in more detail another preferred form function of the message encoding engine that supports fragmentation. The binary message is received 300 by the encoding engine. The binary data message is encrypted 305 using a suitable encryption algorithm and encryption seed.

The binary message is then examined to determine whether or not to fragment 310 the message. If a message is to be fragmented, a two byte message check sum CRC is added 315 to the binary message before fragmentation.

The binary message is split 320 into smaller binary message fragments. Each message fragment comprises respective bit sequences of the binary message. Preferably the whole binary message is represented by the collection of message fragments. Each fragment is encoded 325 using for example a technique as described above with reference to FIG. 2. A two byte header is then added 330 to each fragment until all fragments have been encoded 335.

If the message is not fragmented then the message is encoded 340 using for example a technique as described above with reference to FIG. 2. The two byte header is added 345 to the message.

The message header added to each binary message or fragment supports message versioning, acknowledgment requests, message fragmentation for messages longer than the 160 character limitation imposed by SMS, and message groups.

| Byte # | Bit | Description |
|---|---|---|
| 1 | 7 | Reserved - Always set to 0 |
|   | 6 | Reserved - Always set to 1 |
|   | 5 | Reserved - Always set to 0 |
|   | 4 | Acknowledgement Request (0 = No acknowledgement, 1 = Acknowledgement required) |
|   | 3-1 | Message pay load type: This 3-bit value indicates the eSmart message type which determines how the remainder of the message is interpreted. 0 - Encrypted binary data 1 - Unencrypted binary data 2 - Plain text 3 - Acknowledgement (Message accepted) 4 - Acknowledgement (Message rejected) 5 to 7 - Reserved |
|   | 0 | Only applies to message payload types 0 and 1, always set to FALSE for other message types. Fragmented flag (0 = FALSE, 1 = TRUE) |
| 2 |   | Only applies to message payload types 0 and 1, byte #2 is not present for other payload types. |
|   | 7 | Fragment identifier (0 = $1^{st}$ fragment, or no fragmentation; 1 = $2^{nd}$ fragment) |
|   | 6 | Last message in sequence (1 = FALSE, 0 = TRUE) |
|   | 5-3 | Message Group Number (Identifies a group of messages) |
|   | 2-0 | Message Sequence (Identifies a message within a group) |

The acknowledgement request flag is optional. This flag is used to specify that an acknowledgement message be generated by the receiver. A "message accepted" acknowledgement or a "message rejected" acknowledgement is returned to indicate whether or not the message was processed successfully.

An acknowledgement message will only be sent if the received message has a valid CRC and the acknowledgement request flag was set to true.

Only one acknowledgement is returned in response to a fragmented message, when all fragments have been received and processed.

The header may include a message payload type. This payload type indicates the type of data that is contained in the message and determines how the message will be processed.

The header includes a fragmentation flag. When set to true, this flag indicates that the original message was fragmented and has been sent as multiple messages. As described above, fragmentation is performed on the binary message, and a two byte CRC is appended.

A fragmented message is encoded with a two byte message header for each fragment. Each header includes a fragment identifier. Message processing is only completed when all fragments have been received, the CRC for each fragment verified, and the message reassembled.

In one embodiment, there is a maximum of two fragments per message. The fragment identifier field is a boolean value and indicates whether the message holds the first or second fragment. A suitable time out period is observed to determine if the second fragment of a two part message has been lost. An occurrence of this event is recorded for network statistics reporting.

It will be appreciated that the header could include a fragment identifier suitable to support fragmentation into three or more fragments. The fragment identifier comprises a bit sequence of sufficient length to distinguish each of the encoded message fragments from each other.

A message is identified by its group number and message sequence. The group number is used to identify a group of messages, and the message sequence to identify a message within a group.

The message sequence number also indicates the processing order that is required. The message sequence will always start at 0 to represent the first message in a group. Subsequent messages will be numbered in sequence up to a maximum of 7. The "last message in sequence" flag is used to indicate that this is the last message in the group and hence indicates the total number of messages in the group.

The message group number is only meaningful if the group contains multiple messages and the processing order is important. The group number is ignored and the message is processed immediately if the message sequence number is 0 and the "last message in sequence" flag is set to true.

When processing a message group containing multiple messages, messages within the group must be processed in sequence. Message groups do not need to be processed in numerical order, however only one group should be processed at a time.

In the event that a fragmented message is received incomplete, processing should continue with the next message in the group.

A suitable time limit is preferably placed on receiving a complete group of messages before processing of the group is abandoned. This time limit starts from the time that the first message or message fragment from a group containing multiple messages is received. It is acceptable to restart the time limit when each subsequent message or fragment belonging to the group is received.

Any incomplete processing of groups is preferably recorded for network statistics reporting.

The encoded message can then be sent via an SMS network. As described above in an alternative method the SMS message is sent via an email client.

Sending an SMS message via email requires that the recipient has established the facility to have email forwarded automatically to a cell phone device. The GSM service provider of the terminating device 115 typically provides this forwarding service.

Typically however during the forwarding process additional information is inserted at the beginning of the message. This could include for example a variable field specifying the sender's address and another variable field identifying the subject.

This additional information makes it difficult to locate the beginning of the encoded message. To alleviate this problem, messages can be sent as email with a marker word used as either the subject or inserted at the beginning of the encoded message body. When processing the message this word can be used to mark the start of the encoded message. It is impossible for the string to occur within a correctly encoded message. The message can be assumed to start immediately following the mark up word.

As described above, the typical length for a message is 131 characters. When a message is sent via email and forwarded to a cell phone the message length could increase by 14 or 15 characters plus the length of the sender's address. This means that the length of the sender's address should be a maximum of 15 characters to ensure the complete message reaches the recipient's cell phone intact. Alternatively the sender's address could be set to be a maximum of 39 characters to ensure that the message data part of the message reaches the recipient's cell phone intact.

The foregoing describes the invention including preferred forms thereof. Modifications and improvements as would be obvious to those skilled in the art are intended to be incorporated within the scope hereof, as defined by the accompanying claims.

The invention claimed is:

1. A method of encoding a binary data message for transmission over a data network, the method comprising:
    allocating consecutive six bit sequences from the binary data message to consecutive respective bytes of an encoded data message;
    adding a predetermined bias value to some or all of the byte values of the encoded data message; and
    replacing respective selected data byte values in the encoded data message with one or more corresponding replacement data byte values.

2. The method of claim 1 wherein the step of allocating consecutive six bit sequences further comprises allocating a two bit null sequence and the six bit sequences to respective bytes of the encoded data message.

3. The method of claim 1 further comprising allocating the two bit null sequence followed by the six bit sequences to respective bytes of the encoded data message.

4. The method of claim 1 wherein the predetermined bias value is 32.

5. The method of claim 1 wherein at least some of the selected data byte values represent character values not compatible with the data network.

6. The method of claim 5 wherein the selected data byte values include one or more decimal numbers in the range 91 to 95.

7. The method of claim 1 wherein the selected data byte values include one or more of the decimal numbers 32, 36 and 64.

8. The method of claim 1 further comprising calculating the length of the encoded data message.

9. The method of claim 8 further comprising adding a data length indicator to the encoded message, the data length indictor representing the calculated length of the encoded data message.

10. The method of claim 1 further comprising encrypting the binary data message prior to allocating the consecutive six bit sequences.

11. A method of encoding a binary data message for transmission over a data network, the method comprising:
    forming two or more message fragments from the binary message, each message fragment comprising respective bit sequences of the binary message;
    encoding each message fragment by the method of any one of the preceding claims to form two or more encoded message fragments; and
    adding a header to each encoded message fragment.

12. The method of claim 11 wherein the header includes a fragment identifier.

13. The method of claim 12 comprising forming only two encoded message fragments, the fragment identifier comprising a boolean value.

14. The method of claim 12 comprising forming three or more encoded message fragments, the fragment identifier comprising a bit sequence of sufficient length to distinguish each of the encoded message fragments from each other.

15. A message encoding engine for encoding a binary data message for transmission over a data network, the encoding engine configured to:
    allocate consecutive six bit sequences from the binary data message to consecutive respective bytes of an encoded data message;
    add a predetermined bias value to some or all of the byte values of the encoded data message; and
    replace respective selected data byte values in the encoded data message with one or more corresponding replacement data byte values.

16. The message encoding engine of claim 15 further configured to:
    form two or more message fragments from the binary message, each message fragment comprising respective bit sequences of the binary message;
    encode each message fragment to form two or more encoded message fragments; and
    add a header to each encoded message fragment.

* * * * *